(12) United States Patent
Naghi

(10) Patent No.: US 6,491,406 B2
(45) Date of Patent: *Dec. 10, 2002

(54) PASS-THRU APPARATUS FOR USE WITH A PORTABLE ELECTRONIC OR COMPUTING DEVICE

(75) Inventor: David Naghi, Los Angeles, CA (US)

(73) Assignee: Technology Creations, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/045,794

(22) Filed: Jan. 9, 2002

(65) Prior Publication Data

US 2002/0057566 A1 May 16, 2002

Related U.S. Application Data

(63) Continuation-in-part of application No. 09/809,913, filed on Mar. 15, 2001, which is a continuation-in-part of application No. 09/712,692, filed on Nov. 13, 2000, now Pat. No. 6,318,873, which is a continuation of application No. 09/330,322, filed on Jun. 11, 1999, now Pat. No. 6,186,636.

(51) Int. Cl.[7] ............................................. F21V 33/00
(52) U.S. Cl. ................................... 362/85; 362/109
(58) Field of Search ........................ 362/85, 109, 198

(56) References Cited

U.S. PATENT DOCUMENTS

| | | | |
|---|---|---|---|
| 1,651,307 A | 11/1927 | Wilkinson | |
| 3,065,339 A | 11/1962 | Fahey, Jr. et al. | 240/25 |
| D238,959 S | 2/1976 | Kurokawa et al. | D48/20 F |
| D251,687 S | 4/1979 | Kurokawa | D48/20 F |
| 5,122,937 A | 6/1992 | Stoudemire | 362/109 |
| 5,122,941 A | 6/1992 | Gross et al. | 362/276 |
| 5,136,477 A | 8/1992 | Lemmey | 362/198 |
| 5,183,325 A | 2/1993 | Hurdle | 362/109 |
| 5,379,201 A | 1/1995 | Friedman | 362/191 |
| D377,840 S | 2/1997 | Chang | D26/62 |
| 5,615,945 A | 4/1997 | Tseng | 362/226 |
| 5,708,840 A | 1/1998 | Kikinis et al. | 395/281 |
| 5,822,546 A | 10/1998 | George | 395/281 |
| D418,240 S | 12/1999 | Sherman | D26/63 |

OTHER PUBLICATIONS

Amazon.com product web page printout for "Adventure Book Light and Flashlight" by Lumatec; http://www.amazon.com/exec/obidos/ASIN/b00000IJZM/ 104–9549104–0986847; printed Mar. 2, 2000.

Book light product internet web page printout; http:// store1.yimg.com/I/parksherman_1550_902141;printed Mar. 2, 2000.

(List continued on next page.)

*Primary Examiner*—Thomas M. Sember
*Assistant Examiner*—Ali Alavi
(74) *Attorney, Agent, or Firm*—Procopio, Cory, Hargreaves & Savitch, LLP

(57) ABSTRACT

A pass-thru illumination apparatus and method for illuminating an object associated with a portable electronic or computing device. The apparatus includes a first plug and one or more ports, a body connected to the first plug, and one or more illumination devices attached to the body. The method includes plugging the first plug of the apparatus into the first port of the device and plugging one or more plugs of one or more peripherals into the one or more ports of the apparatus to accomplish at least one of powering the one or more peripherals and communicating the one or more peripherals with the device.

14 Claims, 3 Drawing Sheets

OTHER PUBLICATIONS

"Designed Halogen Lamps With Multiple Features,", *Taiwan Lighting*, Feb. 1997, p. 69.

FlyLight™ Notebook USB Light, Kensington Products; http://www.kensington.com/products/pro_cas_d1334.html, Printed Feb. 15, 2001.

Igo.com product web page printout for "NBL–100 Notebook Light" by Interex; http://www.igo.com/cgi–bin/ncommerce3/ProductDisplay?prmenbr=1&prrfnbr–522530; printed Jul. 21,2000.

Sierra Gold Marketing "SGM28367" Clip On Light product web page printout; http://www.sgm.simplenet.com/boutique/special/sgm28367.htm; printed Mar. 2, 2000.

"The Ittybitty Book Light"internet web page printout; http; www.zelco.com/10013.jpg; printed Mar. 2, 2000.

"Ultimate Palmtop Computer Lights®" internet web page printout; http://www.std.com/sfl/3.pct.html; printed Mar. 2, 2000.

US 6,491,406 B2

PASS-THRU APPARATUS FOR USE WITH A PORTABLE ELECTRONIC OR COMPUTING DEVICE

This application is a continuation-in-part of pending prior application Ser. No. 09/809,913 filed on Mar. 15, 2001, which is a continuation-in-part of application Ser. No. 09/712,692, filed on filed on Nov. 13, 2000, now U.S. Pat. No. 6,318,873, which is a continuation of application Ser. No. 09/330,322, filed on Jun. 11, 1999, now U.S. Pat. No. 6,186,636.

FIELD OF THE INVENTION

The present invention is in the field of lighting devices for portable electronic or computing devices.

BACKGROUND OF THE INVENTION

Compact electronic devices with a viewing screen or keypads have become very common and quite popular. Such devices have been popular for a number of years in connection with hand-held, portable, battery-powered gaming devices. A well-known example of such a device, that has sold millions of units, is the GAME BOY™ device sold by Nintendo. More recently, other electronic devices have also included viewing screens, such as portable video cameras and cellular phones. And, of course, portable computers have long had viewing screens. Although the complexity and cost of such devices can vary greatly, it is common for such devices to use a generally flat, liquid crystal display screen.

Flat, liquid crystal display screens work very well in a well-lit area. However, when such devices are used in dimly lit areas, or at night, it can be difficult, if not impossible, for a user to see anything in the viewing screen. This problem is magnified when such a screen is used in a device that is meant to be portable, and especially when it is a small device.

If a portable device is sufficiently complex, and generally more expensive, such as a portable laptop computer, the device can include lighting within the actual device. An example of such lighting is a portable laptop computer with a backlit screen. However, this solution is not always economically practical, nor does it necessarily solve the problem in smaller devices. Also, if an electronic device does not have a viewing screen, then this option is not even available.

To solve this problem, especially in connection with hand-held, portable, battery-powered gaming devices, a number of different solutions have been proposed. Such solutions have typically included add-on devices with their own source of electrical power. These devices can be designed to fit onto the electronic device or be designed for use in connection with the electronic device. However, because such devices use their own source of electrical power, they tend to be rather bulky and heavy. In addition, the second source of electrical power increases cost and creates the possibility of another source of power failure.

Accordingly, there is a long felt need for a simple, economical, device that can illuminate portable electronic or computing devices without the drawbacks associated with prior illumination devices.

A need also exists for a pass-thru illumination apparatus that not only illuminates objects associated with the portable electronic or computing device such as the screen, keyboard, paperwork, etc. but also allows peripherals to be attached to the portable electronic or computing device through the illumination apparatus.

SUMMARY OF THE INVENTION

An aspect of the invention involves a method of illuminating an object associated with a portable electronic or computing device with a pass-thru illumination apparatus. The method includes providing a pass-thru illumination apparatus including a first plug and one or more ports, a body connected to the first plug, and one or more illumination devices attached to the body; plugging the first plug of the pass-thru illumination apparatus into a first port of the electronic or computing device; and plugging one or more plugs of one or more peripherals into the one or more ports of the pass-thru illumination apparatus to accomplish at least one of powering the one or more peripherals and communicating the one or more peripherals with the electronic or computing device.

One or more implementations of the aspect of the invention described immediately above may include one or more of the following. The pass-thru illumination apparatus includes one or power sources to power at least one of the one or more illumination devices and the one or more peripherals. The one or more power sources include a member from the group consisting of one or more rechargeable batteries, one or more disposable batteries, an AC adapter and power cord, a DC adapter and power cord, and one or more fuel cells. The step of plugging the first plug of the pass-thru illumination apparatus into the first port of the electronic or computing device causes at least one of powering of the one or more illumination devices with the power source of the electronic or computing device to illuminate an object associated with the electronic or computing device and powering of the one or more peripherals. The step of plugging the first plug of the pass-thru illumination apparatus into the first port of the electronic or computing device secures the pass-thru illumination apparatus with the portable electronic or computing device without providing an electrical connection between the one or more illumination devices and the power source of the electronic or computing device. The one or more illumination devices include one or more LEDs or white LEDs.

Another aspect of the invention involves a pass-thru illumination apparatus for illuminating an object associated with a portable electronic or computing device. The pass-thru illumination apparatus includes a first plug to plug the pass-thru illumination apparatus into the first port of the electronic or computing device, one or more ports to receive one or more plugs of one or more peripherals to at least one of power the one or more peripherals and communicate the one or more peripherals with the electronic or computing device, a body connected to the first plug, and one or more illumination devices carried by the body for illuminating an object associated with the electronic or computing device.

One or more implementations of the aspect of the invention described immediately above may include one or more of the following. The pass-thru illumination apparatus includes one or more power sources to power at least one of the one or more illumination devices and the one or more peripherals. The one or more power sources include a member from the group consisting of one or more rechargeable batteries, one or more disposable batteries, an AC adapter and power cord, a DC adapter and power cord, and one or more fuel cells. At least one of the one or more illumination devices and the one or more peripherals are powered by the power source of the electronic or computing device. The pass-thru illumination apparatus is secured to the portable electronic or computing device through the first plug and first port without providing an electrical connection between the one or more illumination devices and the power source of the electronic or computing device. The one or more illumination devices include one or more LEDs or white LEDs.

DETAILED DESCRIPTION OF THE PREFERRED EMBODIMENT

Figure 1:
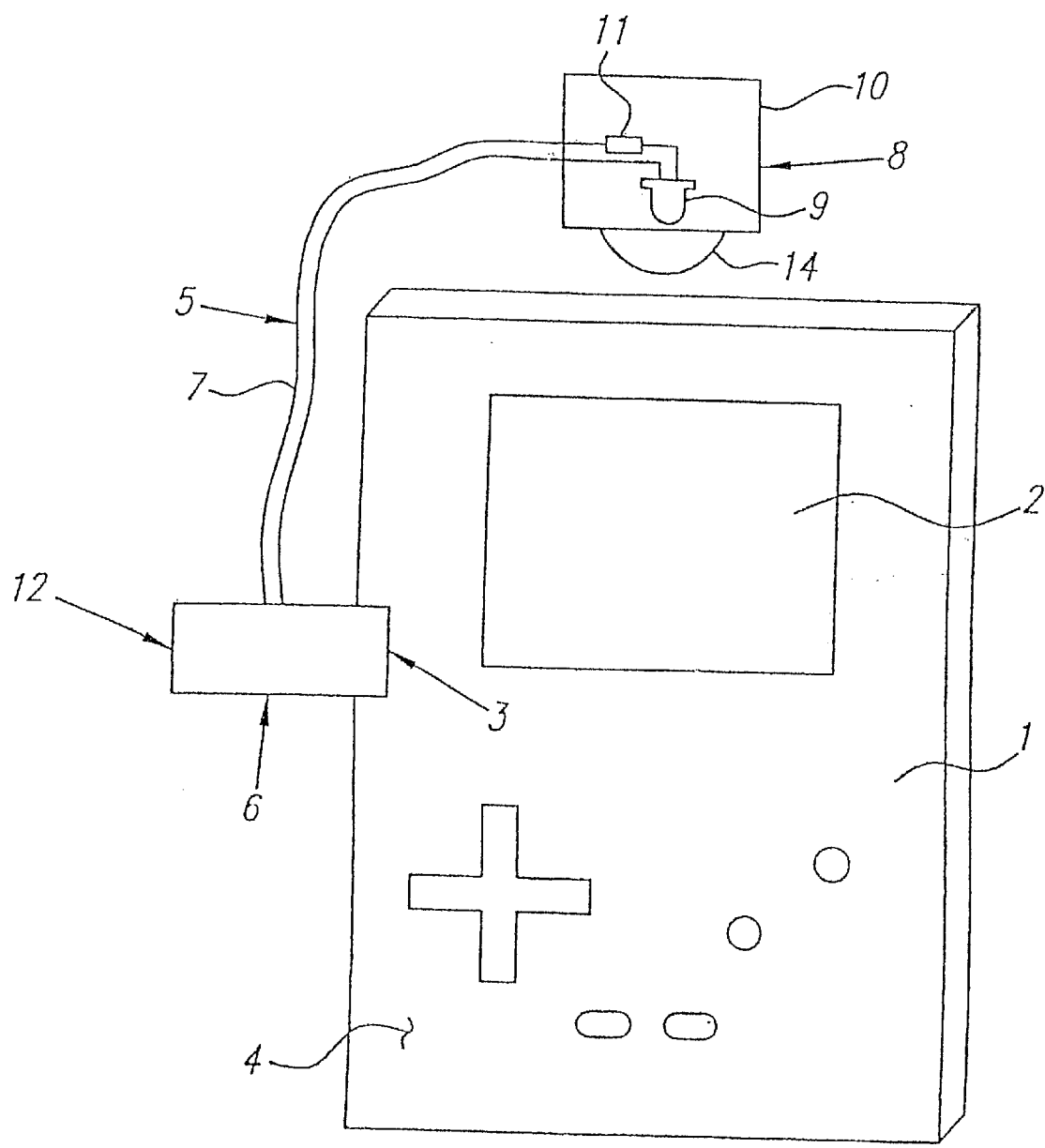
FIG. 1 is a schematic representation of a preferred embodiment of the present invention.

FIG. 1 illustrates how a preferred embodiment of the present invention can be used with a portable electronic game device, such as a GAME BOY™ device. Although this drawing depicts a portable electronic game device, the invention is adaptable to any portable electronic device that has a utility power jack in electrical connection with a power source, such as, but not by way of limitation, a cellular phone, a personal digital assistant ("PDA"), a digital camera, or a video camera.

In the preferred embodiment shown in FIG. 1, the electronic device 1 has a viewing screen 2, a power source and a utility power jack. The power source and utility power jacks are not visible and are shown generally as 3 and 4, because their location and configuration will vary depending upon the design of a given portable electronic device. The power source 3 may be self-contained, such as batteries in a battery compartment. The power source 3 may or may not be augmented by a plug-in capability to a non-portable power source, such as a wall outlet.

The illumination apparatus, shown generally as 5, includes a plug, shown generally as 6, for plugging the illumination apparatus 5 into the utility power jack 4 of the electronic device 1. The exact configuration of the plug 6 should be designed so as to mate with the utility power jack 4 and create a mechanical and electrical connection between the utility power jack 4 and the plug 6 when the apparatus 5 is plugged into the electronic device 1.

The illumination apparatus 5 also includes a body 7 and an illumination device 8. The body 7 connects the illumination device 8 to the plug 6, and the body is preferably comprised of a flexible arm. The illumination device 8 is electrically connected to the utility power jack 4 through the plug 6 and the body 7 so that the illumination device 8 is powered by the power source 2 when the illumination apparatus 5 is plugged into the electronic device 1. The electrical connection between the illumination device 8 and the plug 6 can be by any suitable means, such as by a wire (not shown). It is especially preferred that the body 7 can be adjusted, when the apparatus 5 is plugged into the utility power jack 4, to adjust the height and/or the angle of the illumination device 8 relative to the electronic device 1.

In the preferred embodiment of the present invention, the illumination device 8 is comprised of a light emitting diode ("LED") 9 housed in a case housing 10. The housing 10 can also include suitable electronics, such as a resistor 11, or a regulator (not shown) for varying the intensity of light given off by the LED. In an especially preferred embodiment, the LED 9 is a white light diode. The housing can also include additional features, such as a diffuser lens 9, or a magnifier (not shown).

When the plug 6 of the illumination apparatus 5 is plugged into the utility power jack 4 of the electronic device 1, it necessarily occupies the connection that the utility power jack 4 would otherwise provide to a user of the electronic device 1. Because a user of the electronic device 1 might need to connect some other device to the utility power jack 4, it is especially preferred that the plug 6 be constructed so as to include a second utility power jack 12. The second utility power jack 12 is adapted to receive a second plug and provide a mechanical and electrical connection for the second plug equivalent to that which is provided by the utility power jack 4. Thus, the second utility power jack 12 will provide electrical communication for the second plug with the utility power jack 4 when the second plug is plugged into the plug 6 and the plug 6 is plugged into the utility power jack 4.

The present invention is also adaptable to a portable computing device with a display screen that is not illuminated by the portable computing device. In such an embodiment, the illumination apparatus is plugged into a utility port of the computing device in electrical connection with a power source instead of the utility power jack 4 of the electronic device 1. In such a device, the utility port can be any port that allows connection of additional products or communication devices, or cables, or any additional accessory or product. The illumination apparatus can have a second utility port adapted to receive a second plug that is in electrical communication with the utility port when the second plug is plugged into the plug and the plus is plugged into the utility port. In all other respects, the structure and function of the illumination apparatus would be the same as for the illumination apparatus 5 described above in connection with electronic device 1.

Figure 2:
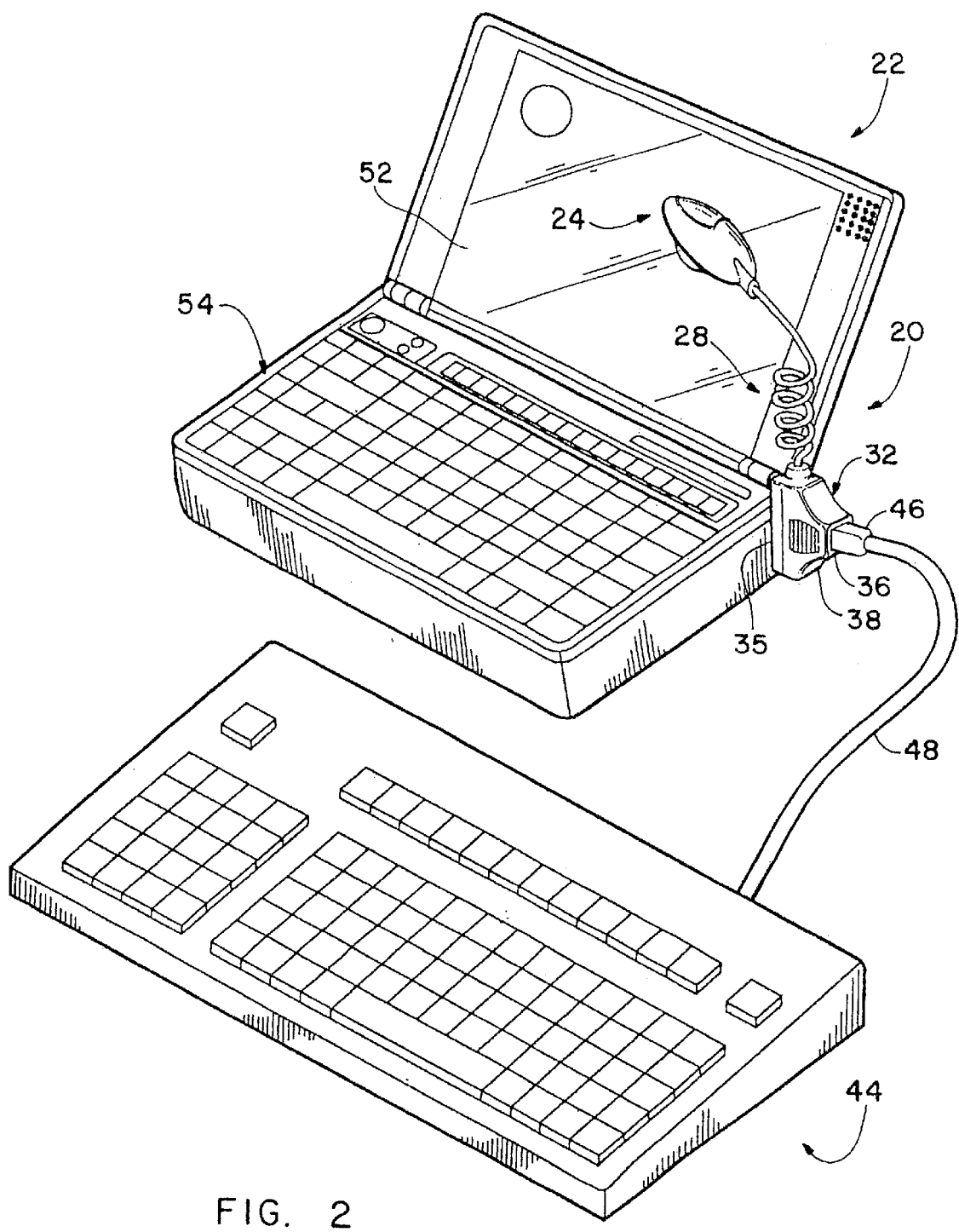
FIG. 2 is a perspective view of an embodiment of a pass-thru illumination apparatus shown in conjunction with a laptop computer and a peripheral keyboard.
Figure 3:
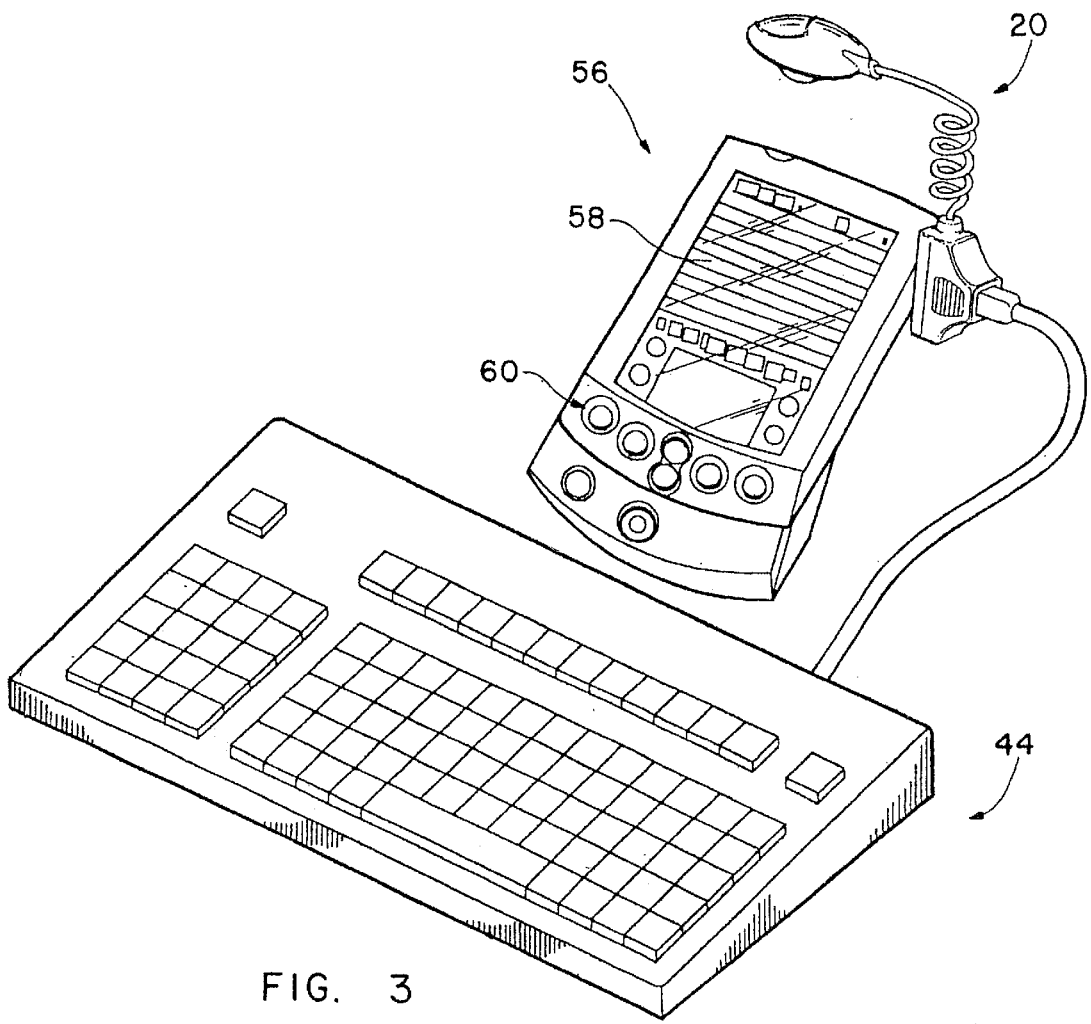
FIG. 3 is a perspective view of the pass-thru illumination apparatus shown in FIG. 2 in conjunction with a Personal Digital Assistant ("PDA") and a peripheral keyboard.
Figure 4:
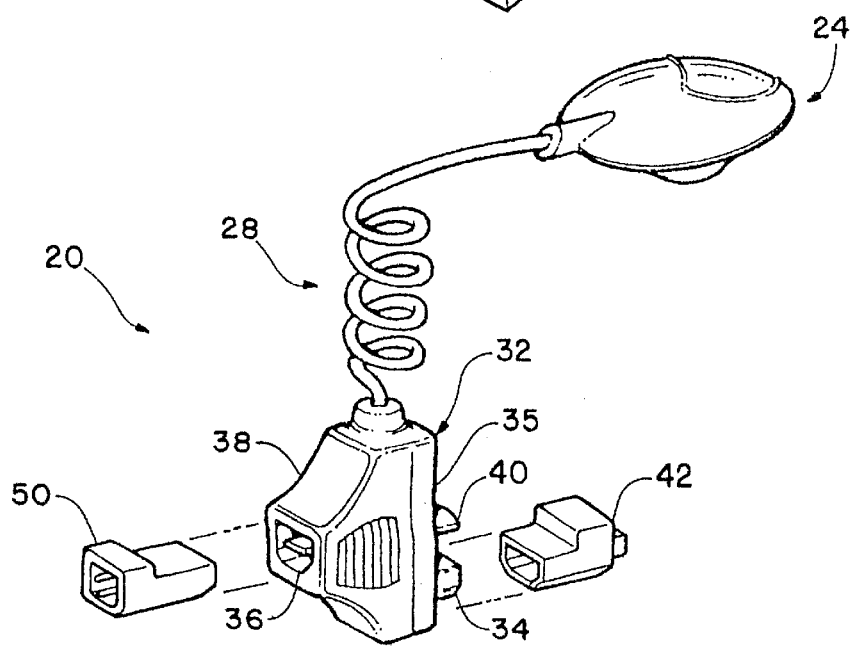
FIG. 4 is a perspective view of the pass-thru illumination apparatus shown in FIG. 2 in conjunction with a pair of adapters that may be used with the pass-thru illumination apparatus.

With reference to FIGS. 2–4, a pass-thru illumination apparatus 20 constructed in accordance with an additional embodiment of the invention will now be described in conjunction with a laptop or notebook computer 22. The illumination apparatus 20 is similar to the illumination apparatus 5 shown in FIG. 1, except the illumination apparatus 20 includes an oval, UFO-shaped light or case housing 24, a helical bendable wire body 28, and a pass-thru plug member 32. The light housing 24 houses a light source, preferably at least one white LED. The pass-thru plug member 32 includes a first plug 34 on a flat side 35 of the plug member 32 and a second jack or port 36 on an opposite, tapered side 38 of the plug member 32. A support flange 40 may extend from the flat side 35 of the plug member 32.

In use, the pass-thru illumination apparatus 20 is plugged into the laptop computer 22 by plugging the first plug 34 of the apparatus 20 into a serial port or first port of the laptop computer 22. The support flange 40 helps to secure the apparatus to the laptop computer 22. A first adapter 42 may be used to interface the first plug 34 with the serial port of the laptop computer 22 if the first plug 34 is not sized to mate with the serial port. The adapter 42 includes an adapter body having a first end configured to mate with the first plug 34 of the pass-thru illumination apparatus 20 and a second end configured to mate with the serial port or first port of the laptop computer 22. The pass-thru illumination apparatus 20 may include different configuration plugs 34 and/or may be used with a variety of different configuration adapters 42, e.g., a family of different configuration adapters, to ensure communication of the apparatus 20 with laptop computers 22 having different configuration ports. The illumination apparatus 20 draws power through the serial port of the laptop computer 22 to power and illuminate the light source in the light housing 24.

A peripheral such as a keyboard 44 may connect with the laptop computer 22 through the pass-thru illumination apparatus 20. This may be accomplished by plugging a keyboard or second plug 46 at the end of a keyboard cord 48 into the second port 36 of the plug member 32. A second adapter 50 may be used to interface the keyboard plug 46 with the second port 36 of the plug member 32 if the second port 36 is not configured to mate with the keyboard plug 46. The adapter 50 includes an adapter body having a first end configured to mate with the second plug 46 of the peripheral 44 and a second end configured to mate with the second port 36 of the pass-thru illumination apparatus 20. The pass-thru illumination apparatus 20 may include different configuration ports 36 and/or may be used with a variety of different configuration adapters 50, e.g., a family of different configuration adapters, to ensure communication of peripherals with different configuration plugs with the apparatus 20.

In an alternative embodiment, the pass-thru illumination apparatus 20 may be powered by a power source in addition to, or instead of, the power source of the device that the apparatus is attached to (e.g., laptop computer 22). Examples of such a power source may include one or more of at least one rechargeable battery associated with the apparatus 20, at least one disposable battery associated with the apparatus 20, an AC or DC adapter and power cord that may be used to connect the apparatus 20 to an AC outlet or DC power source (e.g., automobile cigarette lighter), and at least one fuel cell. A pass-thru illumination apparatus 20 including a power source may provide additional power (or the only power) for powering the one or more illumination devices of the apparatus 20 and one or more peripherals (e.g., keyboard 44). This reduces or eliminates the power burden on the device that the apparatus is attached to (e.g., laptop computer 22). Reducing or eliminating the power burden on the device that the apparatus 20 is attached to is especially important when more than one peripheral is powered via the apparatus 20 (the apparatus 20 may include more than one jack or port 36 (e.g., 2, 3, 4, etc.) to connect more than one peripheral with the device (e.g., laptop computer 22)).

In a further embodiment of the apparatus 20, the plug 34 may be used solely to help secure the apparatus 20 to the device (e.g., laptop computer 22, handheld portable video game device). In this embodiment, it is especially important for the apparatus 20 to include its own power source for powering the one or more illumination devices of the apparatus 20 and/or one or more peripherals.

The keyboard 44 may draw power and/or communicate with the laptop computer 22 through the pass-thru illumination apparatus 20. The bendable body 28 may be bent to a desired orientation for ideal lighting of any object(s) associated with the laptop computer 22, e.g., laptop screen 52, laptop keyboard 54, peripheral keyboard 44, other peripheral(s), reading materials. Also, if the bendable body 28 becomes uncoiled, the bendable body 28 can be reshaped into a coil by bending and wrapping the body 28 around a pen, pencil, or similar instrument and removed.

Likewise, with reference specifically to FIG. 3, the pass-thru illumination apparatus 20 may be plugged into a port of a Personal Digital Assistant ("PDA") 56 and a peripheral, e.g., keyboard 44, may be powered by and/or communicate with the PDA 56 via the pass-thru illumination apparatus 20. Similar to the laptop example illustrated in FIG. 2, the pass-thru illumination apparatus 20 may be bent to a desired orientation for ideal lighting of any object(s) associated with the PDA 56, e.g., PDA screen 58, keypad 60, peripheral keyboard 44, other peripheral(s), reading materials.

Similarly, the pass-thru illumination apparatus 20 may be plugged into ports of other electronic or computing devices and peripherals may be powered by and/or communicate with the electronic or computing devices via the pass-thru illumination apparatus 20. The illumination apparatus 20 is then used to illuminate any object(s) associated with the electronic or computing device. Examples of other electronic or computing devices that the pass-thru illumination apparatus 20 may be used with include, but not by way of limitation, remote controls, internet phones, cell phones, non-backlit or insufficiently lit handheld video game devices, calculators, portable electronics with a display or keyboard, and other hand-held devices.

It will be readily apparent to those skilled in the art that still further changes and modifications in the actual concepts described herein can readily be made without departing from the spirit and scope of the invention as defined by the following claims.

What is claimed is:

1. A method of illuminating an object associated with a portable electronic or computing device with a pass-thru illumination apparatus, the portable electronic or computing device including a first port in communication with a power source, comprising:

providing a pass-thru illumination apparatus including a first plug and one or more ports, a body connected to the first plug, and one or more illumination devices attached to the body;

plugging the first plug of the pass-thru illumination apparatus into the first port of the electronic or computing device;

plugging one or more plugs of one or more peripherals into the one or more ports of the pass-thru illumination apparatus to accomplish at least one of powering the one or more peripherals and communicating the one or more peripherals with the electronic or computing device.

2. The method of claim 1, wherein the pass-thru illumination apparatus includes one or power sources to power at least one of the one or more illumination devices and the one or more peripherals.

3. The method of claim 2, wherein the one or more power sources include a member from the group consisting of one or more rechargeable batteries, one or more disposable batteries, an AC adapter and power cord, a DC adapter and power cord, and one or more fuel cells.

4. The method of claim 1, wherein the step of plugging the first plug of the pass-thru illumination apparatus into the first port of the electronic or computing device causes at least one of powering of the one or more illumination devices with the power source of the electronic or computing device to illuminate an object associated with the electronic or computing device and powering of the one or more peripherals.

5. The method of claim 1, wherein the step of plugging the first plug of the pass-thru illumination apparatus into the first port of the electronic or computing device secures the pass-thru illumination apparatus with the portable electronic or computing device without providing an electrical connection between the one or more illumination devices and the power source of the electronic or computing device.

6. The method of claim 1, wherein the one or more illumination devices include one or more LEDs.

7. The method of claim 6, wherein the one or more LEDs include one or more white LEDs.

8. A pass-thru illumination apparatus for illuminating an object associated with a portable electronic or computing device including a first port in communication with a power source, comprising:

a first plug to plug the pass-thru illumination apparatus into the first port of the electronic or computing device;

one or more ports to receive one or more plugs of one or more peripherals to at least one of power the one or more peripherals and communicate the one or more peripherals with the electronic or computing device;

a body connected to the first plug; and one or more illumination devices carried by the body for illuminating an object associated with the electronic or computing device.

9. The pass-thru illumination apparatus of claim 8, wherein the pass-thru illumination apparatus includes one or more power sources to power at least one of the one or more illumination devices and the one or more peripherals.

10. The pass-thru illumination apparatus of claim 9, wherein the one or more power sources include a member from the group consisting of one or more rechargeable batteries, one or more disposable batteries, an AC adapter and power cord, a DC adapter and power cord, and one or more fuel cells.

11. The pass-thru illumination apparatus of claim 8, wherein at least one of the one or more illumination devices and the one or more peripherals are powered by the power source of the electronic or computing device.

12. The pass-thru illumination apparatus of claim 8, wherein the pass-thru illumination apparatus is secured to the portable electronic or computing device through the first plug and first port without providing an electrical connection between the one or more illumination devices and the power source of the electronic or computing device.

13. The pass-thru illumination apparatus of claim 8, wherein the one or more illumination devices include one or more LEDs.

14. The pass-thru illumination apparatus of claim 13, wherein the one or more LEDs include one or more white LEDs.

* * * * *